(12) United States Patent
Kokis et al.

(10) Patent No.: US 7,797,221 B2
(45) Date of Patent: Sep. 14, 2010

(54) PROPRIETARY QUOTE DATA

(75) Inventors: Christopher Kokis, Monroe, CT (US);
Robert A. Waghorne, FairField, CT (US); Peter J. Martyn, Ridgewood, NJ (US); Charis Yang, Brooklyn, NY (US)

(73) Assignee: The NASDAQ OMX Group, Inc., Rockville, MD (US)

( * ) Notice: Subject to any disclaimer, the term of this patent is extended or adjusted under 35 U.S.C. 154(b) by 2717 days.

(21) Appl. No.: 10/294,998

(22) Filed: Nov. 14, 2002

(65) Prior Publication Data

US 2003/0172023 A1 Sep. 11, 2003

Related U.S. Application Data

(60) Provisional application No. 60/385,979, filed on Jun. 5, 2002, provisional application No. 60/385,988, filed on Jun. 5, 2002, provisional application No. 60/335,388, filed on Nov. 14, 2001.

(51) Int. Cl.
*G06Q 40/00* (2006.01)

(52) U.S. Cl. .......................................... 705/37; 705/35

(58) Field of Classification Search ................... 705/36, 705/35, 37
See application file for complete search history.

(56) References Cited

U.S. PATENT DOCUMENTS 6,615,188 B1 * 9/2003 Breen et al. .................... 705/37
6,772,132 B1 * 8/2004 Kemp et al. ............... 705/36 R

* cited by examiner

*Primary Examiner*—James A Kramer
*Assistant Examiner*—James A Vezeris
(74) *Attorney, Agent, or Firm*—Fish & Richardson P.C.

(57) ABSTRACT

A proprietary position display process includes an ask-side display process for displaying, in a multi-column format, an ask-side entry for a specific security that is offered for sale by a market participant on a securities market. This ask-side entry includes a market participant identifier, a lot size, a reserve size, and an ask price. A bid-side display process displays, in a multi-column format, a bid-side entry for the specific security that is sought for purchase by a market participant on a securities market. This bid-side entry includes a market participant identifier, a lot size, a reserve size, and a bid price. The bid-side display process is configured to display the bid-side entry such that it is essentially a mirror image of the ask-side entry.

20 Claims, 5 Drawing Sheets

PROPRIETARY QUOTE DATA

RELATED APPLICATIONS

This application claims the priority of: U.S. Provisional Patent Application No. 60/335,388, entitled "Super Montage", and filed on Nov. 14, 2001; U.S. Provisional Patent Application No. 60/385,979, entitled "Supermontage Architecture", and filed on Jun. 5, 2002; U.S. Provisional Patent Application No. 60/385,988, entitled "Security Processor", and filed on Jun. 5, 2002; and U.S. Utility Patent Application No. 10/206,898, entitled "A Market Participant Interest Dissemination Process and Method", and filed on Jul. 25, 2002.

BACKGROUND

This invention relates to electronic securities trading, and the processing and displaying of information relating to electronic securities trading.

Electronic equity markets, such as The Nasdaq Stock Market™ collect, aggregate, and display pre-trade information to market participants. In the Nasdaq Stock Market, for example, this pre-trade information takes the form of a quote that represents a single or an aggregate of same-priced principal or agency orders. A market, such as The Nasdaq Stock Market™, also provides trading platforms through which market participants may trade securities in the marketplace.

SUMMARY

According to an aspect of this invention, a proprietary position display process includes an ask-side display process for displaying, in a multi-column format, an ask-side entry for a specific security that is offered for sale by a market participant on a securities market. This ask-side entry includes a market participant identifier, a lot size, a reserve size, and an ask price. A bid-side display process displays, in a multi-column format, a bid-side entry for the specific security that is sought for purchase by a market participant on a securities market. This bid-side entry includes a market participant identifier, a lot size, a reserve size, and a bid price. The bid-side display process is configured to display the bid-side entry such that it is essentially a mirror image of the ask-side entry.

One or more of the following features may also be included. The ask-side display process includes a tabular display process for simultaneously displaying multiple ask-side entries in an ask-side table. The ask-side display process includes a tabular sorting process for sorting the multiple ask-side entries in accordance with a user-defined sorting parameter, such as the market participant identifier, the lot size, or the ask price. An ask-side aggregate calculation process generates an ask-side aggregate value for a specific ask-side entry, such that the ask-side aggregate value is equal to the lot size of the specific ask-side entry summed with the lot sizes of all preceding ask-side entries included in the ask-side table.

The bid-side display process includes a tabular display process for simultaneously displaying multiple bid-side entries in a bid-side table. The bid-side display process includes a tabular sorting process for sorting the multiple bid-side entries in accordance with a user-defined sorting parameter, such as the market participant identifier, the lot size, and the bid price. A bid-side aggregate calculation process generates a bid-side aggregate value for a specific bid-side entry, such that the bid-side aggregate value is equal to the lot size of the specific bid-side entry summed with the lot sizes of all preceding bid-side entries included in the bid-side table.

A security selection process allows a market participant of the proprietary position display process to select the specific security, and a security data display process displays trade data concerning that specific security. The trade data includes a trade volume amount, a low trade amount, and a high trade amount.

The above-described processes may also be implemented as a method or a sequence of instructions executed by a processor.

One or more advantages can be provided from the above. The market participant can easily monitor their trading activity for a specific security. Further, the market participant can quickly determine their position, reserve, and exposure for that security. By providing the market participant with trade data concerning the security being monitored, the market participant is better able to judge the condition of the market concerning that specific security.

DETAILED DESCRIPTION

Figure 1:
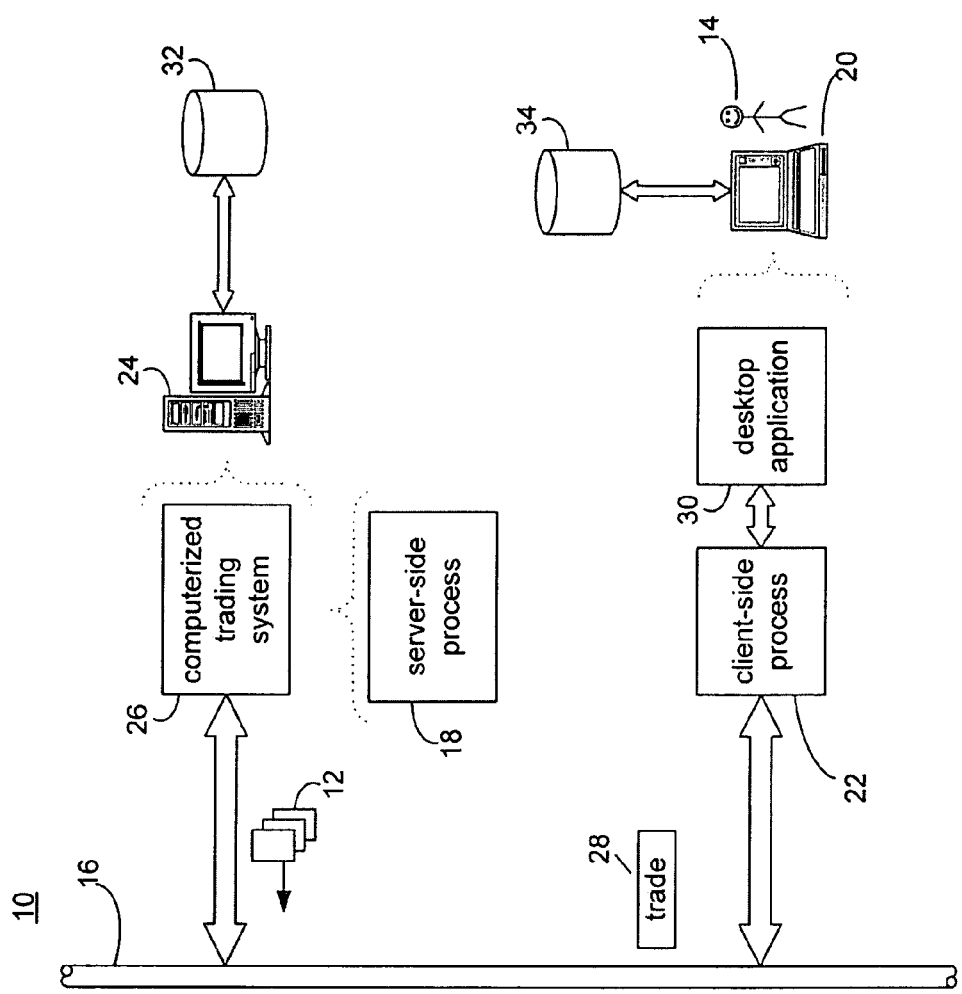
FIG. 1 is a block diagram of a proprietary position display process.

Referring to FIG. 1, there is shown a system 10 for disseminating filtered attributable interest messages 12 to a single market participant 14. These messages 12, which are in the form of a message feed and are processed and broadcast onto a distributed computing network/bus 16 by a server-side process 18, are accessible by the single market participant 14 though a computer 20 running a client-side process 22. Filtered attributable interest messages 12 specify, for a specific security, outstanding orders and quotes placed by the single market participant. This filtered quote and order information allows a single market participant to easily discern the market condition of a particular security, and the respective interest and exposure that they have concerning that security. The message feed assembled by system 10 from filtered attributable interest messages 12 is intended to be a private message feed, in that it is only receivable and readable by the market participant who placed the outstanding orders/quotes.

Server-side process 18 resides on a server 24 that is connected to network/bus 16 (e.g., the Internet, an intranet, a local area network, some other form of network, a data bus, a system bus, etc.). Computerized trading system 26, which trades securities electronically and also resides on server 24, processes trades 28 entered by various market participants (e.g., market participant 14). Market participant 14 typically accesses and uses computerized trading system 26 and client-side process 22 via a desktop application 30 (e.g., Microsoft Internet Explorer™, Netscape Navigator™, the Nasdaq Workstation II™, a specialized desktop interface, etc.) running on computer 20, thus allowing market participant 14 to trade securities with other market participants (not shown).

The instruction sets and subroutines of server-side process 18 are typically stored on a storage device 32 connected to server 24. Additionally, computerized trading system 26 stores all information relating to securities trades on storage device 32. Storage device 32 can be a hard disk drive, a tape drive, an optical drive, a RAID array, a random access memory (RAM), or a read-only memory (ROM), for example.

The instruction sets and subroutines of client-side process 22 are typically stored on a storage device 34, such as a hard disk drive, connected to computer 20.

Server 24 includes at least one central processing unit (not shown) and main memory system (not shown). Typically, server 24 is a multi-processing, fault-tolerant system that includes multiple central processing units that each have a dedicated main memory system or share a common main memory pool. While being executed by the central processing unit(s) of server 24, server-side process 18 resides in the main memory system of server 24. Further, the processes and subroutines of server-side process 18 may also be present in various levels of cache memory incorporated into server 24.

Figure 2:
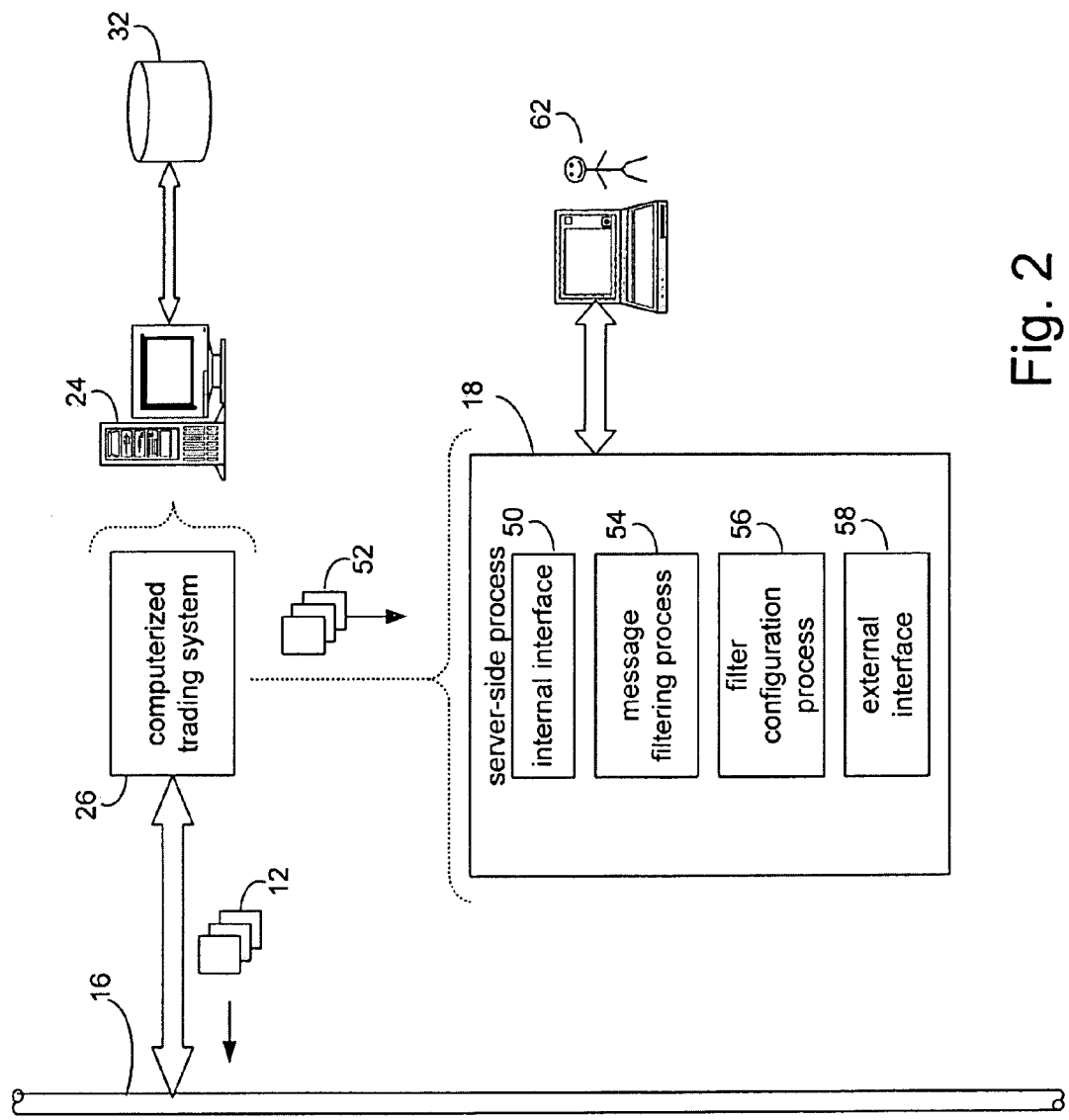
FIG. 2 is a block diagram of a server-side process of the proprietary position display process.

Referring to FIG. 2, server side process 18 includes an internal interface 50 that receives general attributable interest messages 52 from computerized trading system 26. These general attributable interest messages 52, which concern a specific security that is traded on trading system 26, define the outstanding orders and quotes related to that specific security that were placed by any market participant trading on computerized trading system 26. For example, if Market Participant A wished to buy one-hundred shares of XYZ Corp. at $40.02 per share, trading system 26 would provide a general attributable interest message concerning this outstanding order to server-side process 18. Additionally, if Market Participant B was willing to buy one hundred shares of XYZ Corp. for $40.00 per share and willing to sell 50 shares of XYZ Corp. for $40.03 per share, trading system 26 would provide a general attributable interest message concerning this outstanding quote to server-side process 18.

These general attributable interest messages 52 received by internal interface 50 define pending orders (i.e., either an offer to sell or a bid to buy) or pending quotes (i.e., an other to sell and a bid to buy). Each general attributable interest message typically defines the market participant who is either offering to sell or bidding to buy the security, a lot size (i.e., quantity offered for sale or sought for purchase), a per unit value (i.e., the offered price or bid price), and a reserve size (i.e., the number of shares, over and above the lot size, available from or sought by this market participant at this per unit value).

Once these general attributable interest messages 52 are received by internal interface 50, they are filtered by a message filtering process 54 so that the messages only pertain to a single market participant. For example, if a first, second, and third general attributable interest message is received concerning Market Participants A, B, and C respectively, and server side process 18 is generating a message feed for Market Participant B, the first message (i.e. Market Participant A) and the third message (i.e., Market Participant C) are going to be filtered. This filtering by message filtering process 54 results in the generation of filtered attributable interest messages 12.

These filtered attributable interest messages 12 may be ask-side interest messages (for sell orders placed by the single market participant), or bid-side interest messages (for buy orders placed by the single market participant).

During the course of the trading day, computerized trading system 26 trades securities and the trade value of these securities varies as market conditions fluctuate. Whenever a market participant is offering a security for sale at the same price that another market participant is willing to pay for the security, a trade occurs between those two market participants. However, if the highest bid to buy is lower than the lowest offer to sell, the security will not be traded.

For example, assume that the total shares of XYZ Corp. offered for sale by the individual market participants trading on computerized trading system 26 are as follows:

|  | Ask Price | Lot Size | Reserve | Market Participant |
|---|---|---|---|---|
| Offer 1 | $17.10 | 92 | 100 | A |
| Offer 2 | $17.31 | 50 | 50 | B |
| Offer 3 | $17.31 | 111 | 89 | C |
| Offer 4 | $17.31 | 999 | 1000 | D |
| Offer 5 | $17.35 | 1 | 0 | B |
| Offer 6 | $17.35 | 1 | 0 | E |
| Offer 7 | $17.40 | 50 | 50 | D |
| Offer 8 | $18.09 | 1 | 0 | B |
| Offer 9 | $18.09 | 4 | 0 | A |
| Offer 10 | $18.11 | 1 | 0 | B |
| Offer 11 | $18.12 | 1 | 0 | B |
| Offer 12 | $18.13 | 1 | 10 | K |

A general attributable interest message 52 would be generated by computerized trading system 26 for each of these outstanding offers to sell. Notice that Market Participant B is offering fifty shares of XYZ Corp. (plus another fifty shares in reserve) for $17.31 per share; one share for $17.35 per share; one share for $18.09 per share; one share for $18.11 per share; and one share for $18.12 per share.

Further, assume that the total shares of XYZ Corp. sought for purchase by the individual market participants trading on computerized trading system 26 are as follows:

|  | Bid Price | Lot Size | Reserve | Market Participant |
|---|---|---|---|---|
| Bid 1 | $17.09 | 10 | 90 | B |
| Bid 2 | $17.08 | 10 | 50 | C |
| Bid 3 | $17.08 | 999 | 1000 | B |
| Bid 4 | $17.00 | 1 | 0 | B |
| Bid 5 | $17.00 | 1 | 0 | D |
| Bid 6 | $17.00 | 1 | 0 | E |
| Bid 7 | $17.00 | 1 | 9 | A |
| Bid 8 | $16.95 | 1 | 0 | B |
| Bid 9 | $16.73 | 1 | 0 | E |
| Bid 10 | $16.61 | 5 | 95 | B |
| Bid 11 | $16.44 | 1 | 0 | C |
| Bid 12 | $16.11 | 5 | 10 | B |

A general attributable interest message 52 would be generated by computerized trading system 26 for each of these outstanding bids to buy. Notice that Market Participant B is seeking ten shares (plus another ninety shares in reserve) for $17.09 per share; nine-hundred-ninety-nine shares (plus another one-thousand shares in reserve) for $17.08 per share; one share for $17.00 per share; one share for $16.95 per share; five shares (plus another ninety-five shares in reserve) for $16.61 per share; and five shares (plus another ten shares in reserve) for $16.11 per share.

Since the highest bid price is $17.09 and the lowest ask price is $17.10, no trades of XYZ Corp. will occur until either Market Participant B raises their bid to $17.10 or Market Participant A lowers their ask price to $17.09. This one cent price difference is commonly referred to as the "spread".

As stated above, when general attributable interest messages 52 are received by internal interface 50, they are filtered (by message filtering process 54) so that the messages that pass through the filter only concern a single market participant. This generates filtered attributable interest messages 12. Continuing with the above-stated example, if the general attributable interest messages 52 are filtered (by message filtering process 54) so that they only reflect offers to sell or bids to buy placed by Market Participant B, the filtered attributable interest messages 12 would be as follows:

|  | Ask Price | Reserve | Lot Size |
| --- | --- | --- | --- |
| Offer 2 | $17.31 | 50 | 50 |
| Offer 5 | $17.35 | 0 | 1 |
| Offer 8 | $18.09 | 0 | 1 |
| Offer 10 | $18.11 | 0 | 1 |
| Offer 11 | $18.12 | 0 | 1 |

|  | Bid Price | Reserve | Lot Size |
| --- | --- | --- | --- |
| Bid 1 | $17.09 | 90 | 10 |
| Bid 3 | $17.08 | 1000 | 999 |
| Bid 4 | $17.00 | 0 | 1 |
| Bid 8 | $16.95 | 0 | 1 |
| Bid 10 | $16.61 | 95 | 5 |
| Bid 12 | $16.11 | 10 | 5 |

An external interface 58 publishes (or pushes), over network/bus 16, these filtered attributable interest messages 12. This results in a message feed being pushed across network/bus 16, which is monitorable by market participant 14 using a client-side process 22. Typically, this message feed, which is assembled from filtered attributable interest messages 12, is receivable and readable by only the market participant to which the feed pertains. In the above-stated example, that is Market Participant B. This allows Market Participant B to monitor their status and exposure concerning this security (XYZ Corp.).

Message filtering process 54 is configurable via a filter configuration process 56 that is accessible by an administrator 62. Therefore, if a particular market participant (e.g., Market Participant B) chooses to receive filtered attributable interest messages 12 that concern all of its outstanding orders and quotes for a specific security (e.g., XYZ Corp.), administrator 62 would configure message filtering process 54 so that a message feed is generated (from filtered attributable interest messages 12) for that particular market participant concerning that specific security.

Figure 3:
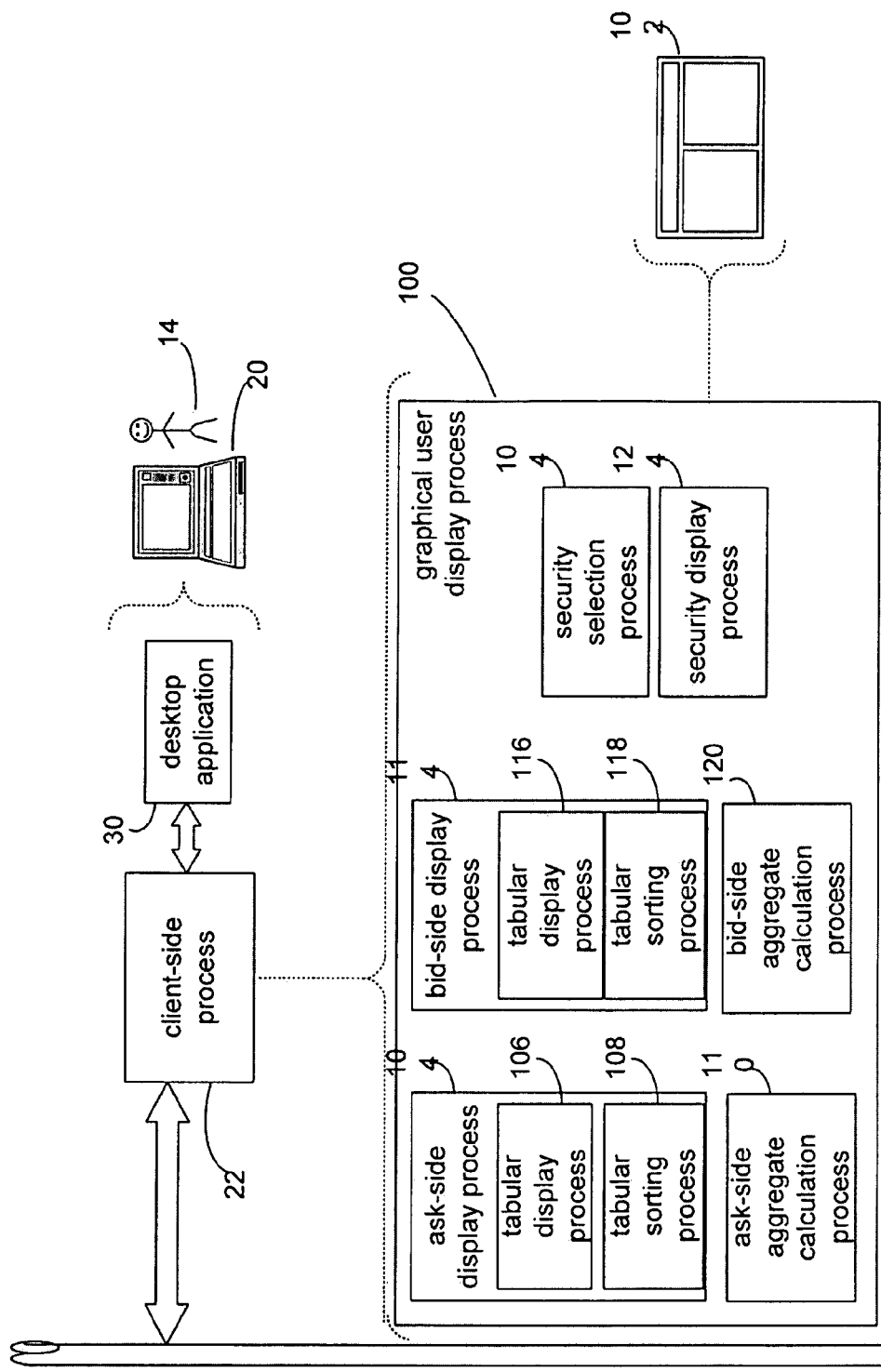
FIG. 3 is a block diagram of a client-side process of the proprietary position display process.

Referring to FIG. 3, a client-side process 22 includes a graphical user display process 100 that displays the attributable interest messages published by external interface 58. The client-side process 22 receives the message feed, which is published by external interface 58 and generated from filtered attributable interest messages 12. This message feed concerns the outstanding orders and quotes placed by the market participant receiving the message feed.

Graphical user display process 100, which allows a market participant 14 to monitor their position and exposure concerning a specific security traded on computerized trading system 26, provides market participant 14 with a summarized display 102 (to be discussed below in greater detail) viewable on computer 20. Preferably, summarized display 102 is one screen in size, thus allowing market participant 14 to quickly get an overview of their position and exposure concerning the specific security without having to scroll through or toggle between multiple screens.

Graphical user display process 100 includes a security selection process 104 that allows market participant 14 to select the specific security they wish to monitor. This selection may occur is several different ways and will vary depending on the manner in which selection process 104 is implemented. For example, market participant 14 may select the security they wish to monitor via a drop-down menu that allows the market participant to scroll through a list of securities and select the one they wish to monitor. This drop down menu may use ticker symbols or may list the full name of the issuer of the security. Alternatively, market participant 14 may be able to enter the security's ticker symbol directly, thus allowing for quicker selection.

Once market participant 14 selects the security, client-side process 22 connects to the appropriate feed that is associated with that security. Typically, summarized display 102 is a real-time display, in that the information shown within the display is regularly updated in accordance with the rate that external interface 58 broadcasts the attributable interest messages encoded within message feed 60. Therefore, in the event that an order is filled (i.e., shares are bought or sold), the client-side process is notified of the sale/purchase so that the summarized display 102 can be updated.

Figure 4:
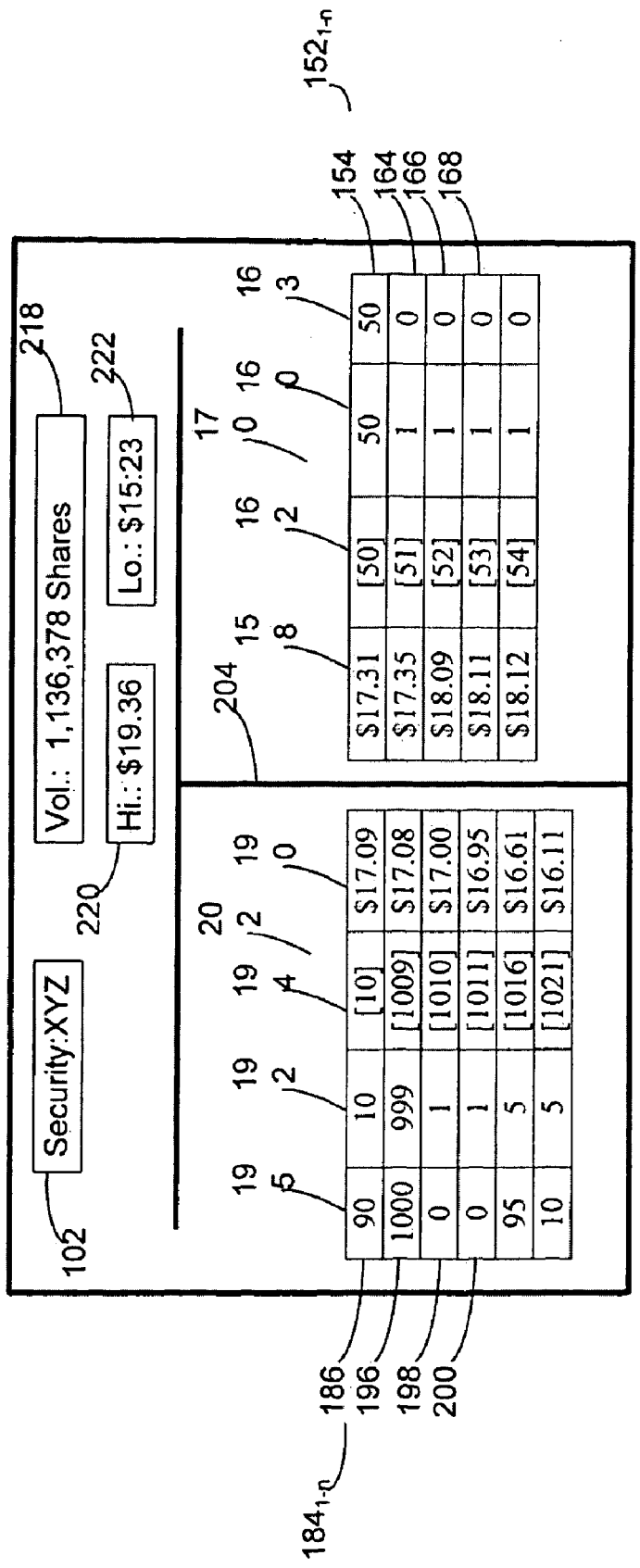
FIG. 4 is a diagrammatic view of a summarized display.

Referring to FIG. 4, an ask-side display process 104 displays, in a multi-column format, an ask-side entry $152_{1-n}$ for each filtered attributable interest message 12 received that is an ask-side interest message. Each discrete ask-side entry $152_{1-n}$ represents a discrete group of the specific security (selected by market participant 14), such that these groups of securities are being offered for sale by market participant 14 and the specifics of the ask-side entry correspond to the ask-side interest message received. For example, ask-side entry 154 concerns a group of fifty shares of the security XYZ Corp. that is currently being offered for sale by Market Participant B for $17.31 per share, such that an additional fifty shares is available for sale in reserve.

Ask-side entry 154 includes multiple columns, each of which provides information concerning the discrete group of securities being offered for sale, such as an ask price 158, a lot size 160 (i.e., the quantity of shares of the selected security available at that ask price from Market Participant 14), an aggregate value 162 (i.e., the total sum of shares available from Market Participant 14 at that price or lower), and a reserve size 163 (i.e., the number of shares, over and above the lot size, available from this market participant at this per unit value).

Ask-side display process 104 includes a tabular display process 106 for simultaneously displaying multiple ask-side entries (e.g., ask-side entries 154, 164, 166, 168, for example). These ask-side entries are arranged vertically so that the ask price, lot size, aggregate value, and reserve size of each entry are aligned, providing ask-side table 170.

Display process 100 includes an ask-side aggregate calculation process 110 for calculating the ask-side aggregate value 162 for each ask-side entry. Ask-side aggregate calculation process 110 determines the ask-side aggregate value 162 for a particular ask-side entry by summing the value of the lot size for that particular ask-side entry with the lot sizes of all preceding ask-side entries included in ask-side table 170. For example, the aggregate value for ask-side entry 154 is [50], the aggregate value for ask-side entry 164 is [51, i.e., 50+1], the aggregate value for ask-side entry 166 is [52, i.e., 50+1+1], and so forth.

A tabular sorting process 108 sorts ask-side entries (e.g., 154, 164, 166, 168) in accordance with a user-defined sorting parameter, such as ascending or descending ask prices, or ascending or descending lot sizes, for example. This enables market participant 14 to group and order the ask-side entries within ask-side table 170 in accordance with their personal preferences. However, the ask-side entries within ask-side table 170 are typically sorted by ask price (as shown in FIG. 4).

In a manner similar to ask-side display process 104, a bid-side display process 114 displays, in a multi-column format, a bid-side entries $184_{1-n}$ for each filtered attributable interest message received that is a bid-side interest message for the same security (i.e., XYZ Corp.) selected by market participant 14. Each discrete bid-side entry $184_{1-n}$ represents a discrete group of the specific security (selected by market participant 14) that is sought for purchase by market participant 14, such that the specifics of the bid-side entry correspond to the bid-side interest message received. For example, bid-side entry 186 concerns a group of ten shares of the security XYZ Corp. that market participant 14 currently wants to purchase for $17.09 per share, such that an additional ninety shares are sought in reserve. Similar to an ask-side entry, a bid-side entry 186 includes multiple columns, each of which provides information concerning the discrete group of securities sought for purchase, such as a bid price 190, a lot size 192 (i.e., the quantity of shares of the selected security sought for purchase by market participant 14 at that bid price), an aggregate value 194 (i.e., the total sum of shares sought for purchase at that price or higher), and a reserve size 195 (i.e., the number of shares, over and above the lot size, sought by this market participant at this per unit value).

Bid-side display process 114 includes a tabular display process 116 for simultaneously displaying multiple bid-side entries (e.g., bid-side entries 186, 196, 198, 200). These bid-side entries are arranged vertically so that the bid price, lot size, aggregate value, and reserve size of each entry are aligned, forming a bid-side table 202.

Display process 100 includes a bid-side aggregate calculation process 120 for calculating the bid-side aggregate value 194 for each bid-side entry. As with ask-side aggregate calculation process 110, bid-side aggregate calculation process 120 determines the bid-side aggregate value 194 for a particular bid-side entry by summing the value of the lot size for that particular bid-side entry with the lot sizes of all preceding bid-side entries included in bid-side table 202. For example, the aggregate value for bid-side entry 186 is [10], the aggregate value for bid-side entry 196 is [1009, i.e., 10+999], the aggregate value for bid-side entry 198 is [1010, i.e., 10+999+1], and so forth.

Similar to that of ask-side entries, a tabular sorting process 118 sorts bid-side entries (e.g., 186, 196, 198, 200) in accordance with a user-defined sorting parameter, such as ascending or descending bid prices, or ascending or descending lot sizes, for example. This enables market participant 14 to group and order the bid-side entries within bid-side table 202 in accordance with their personal preferences. Again, like ask-side table 170, bid-side entries within bid-side table 202 are typically sorted by bid price (as shown in FIG. 4).

Bid-side display process 114 displays bid-side entries so that bid-side table 202 is essentially a mirror image of ask-side table 170. Specifically, the columns in bid-side table 202 are arranged so that they are in the opposite order (i.e., when moving across the tables 170, 202 in a common direction) to that of ask-side table 170. The columns of these tables are essentially mirrored around an imaginary centerline 204. For example, column 158 and column 190 (i.e., ask and bid prices respectively) are the closest columns to centerline 204. Column 162 and column 194 (i.e., ask-side and bid-side aggregate values respectively) are the second closest columns to centerline 204. Further, column 160 and column 192 (i.e., ask-side and bid-side lot sizes respectively) are the third closest columns to centerline 204. And finally, columns 163 and 195 (i.e., ask and bid-side reserve sizes respectively) are the furthest away from centerline 204.

A security display process 124 displays, in summarized display 102, pertinent trade data relating to the specific security (e.g., XYZ Corp.) being monitored by market participant 14. Examples of this pertinent trade data, which is retrieved from computerized trading system 26, include a daily trade volume amount indicator 218, a daily high trade amount indicator 220, and a daily low trade value amount indicator 222.

While the lot sizes 160, 192 and reserve sizes 163, 195 described above are stated to be in units of shares, it is possible for these numbers to also represent groups of one-hundred shares (commonly referred to as "round lots"), or any other amount of shares. In this scenario, ask-side entry 154 may represent an offer to sell five-thousand shares of XYZ Corp, with another five-thousand shares being available in reserve.

While imaginary centerline 204 is shown as being a vertical centerline, this imaginary centerline 204 may be a horizontal centerline, such that ask-side and bid-side entries are arranged in multi-row format and, therefore, mirroring would occur about a horizontal axis.

While server-side process 18 is described above as being configured to publish a message feed 12 that is presorted (i.e., filtered) such that the attributable interest messages in the feed concern only a single security, other arrangements are possible. For example, the message feed may be broadcast so that it includes all of the market participant's attributable interest messages (regardless of the security they pertain to) and client-side process 22 could be configured to filter these message so that ask-side and bid-side entries are created for only messages pertaining to a single security.

Figure 5:
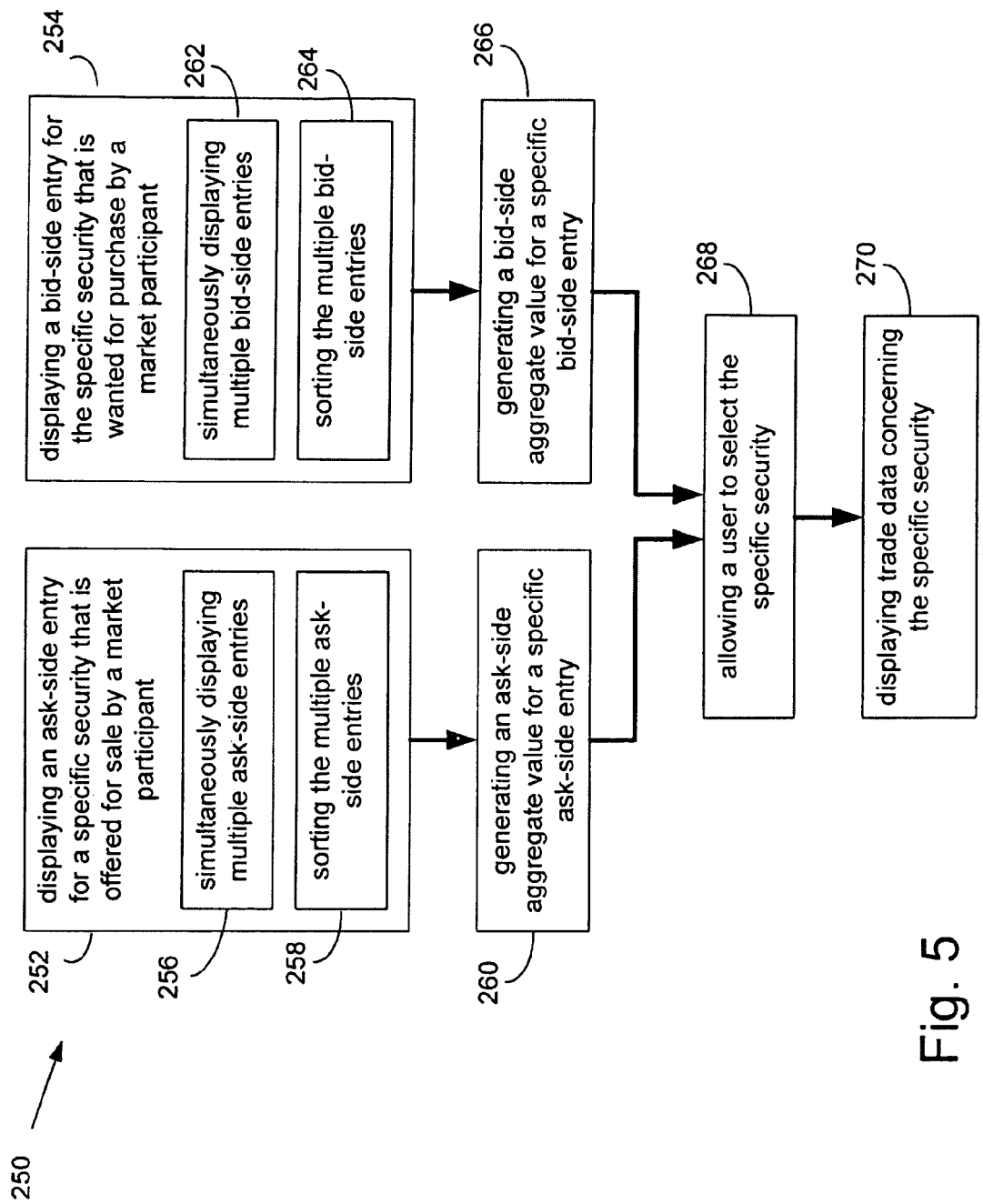
FIG. 5 is a block diagram of a proprietary position display method.

Referring to FIG. 5, a proprietary position display method 250 includes displaying 252 an ask-side entry, in a multi-column format, for a specific security that is offered for sale by a market participant on a securities market. The ask-side entry includes a market participant identifier, a lot size, a reserve size, and an ask price.

A bid-side entry is displayed 254, in a multi-column format, for the security that is sought for purchase by a market participant on a securities market. The bid-side entry includes a market participant identifier, a lot size, a reserve size, and a bid price. This bid-side entry is essentially a mirror image of the ask-side entry.

Displaying an ask-side entry 252 includes simultaneously displaying 256 multiple ask-side entries in an ask-side table and sorting 258 the multiple ask-side entries in accordance with a user-defined sorting parameter.

An ask-side aggregate value is generated 260 for a specific ask-side entry. This ask-side aggregate value is equal to the lot size of that specific ask-side entry summed with the lot sizes of all preceding ask-side entries included in the ask-side table.

Displaying a bid-side entry 254 includes simultaneously displaying 262 multiple bid-side entries in an bid-side table and sorting 264 the multiple bid-side entries in accordance with a user-defined sorting parameter.

A bid-side aggregate value is generated 266 for a specific bid-side entry. This bid-side aggregate value is equal to the lot size of that specific bid-side entry summed with the lot sizes of all preceding bid-side entries included in the bid-side table.

Further, a market participant is allowed 268 to select the specific security, and trade data is displayed 270 concerning the specific security.

The system described herein is not limited to the hardware embodiment described above; it may find applicability in any computing or processing environment. The system may be implemented in hardware, software, or a combination of the two. For example, the system may be implemented using circuitry, such as one or more of programmable logic (e.g., an ASIC), logic gates, a processor, and a memory.

The system may be implemented in computer programs executing on programmable computers that each includes a processor and a storage medium readable by the processor (including volatile and non-volatile memory and/or storage elements). Each such program may be implemented in a high-level procedural or object-oriented programming language to communicate with a computer system. However, the programs can be implemented in assembly or machine language. The language may be a compiled or an interpreted language.

Each computer program may be stored on an article of manufacture, such as a storage medium (e.g., CD-ROM, hard disk, or magnetic diskette) or device (e.g., computer peripheral), that is readable by a general or special purpose programmable computer for configuring and operating the computer when the storage medium or device is read by the computer to perform the functions of the data framer interface. The system may also be implemented as a machine-readable storage medium, configured with a computer program, where, upon execution, instructions in the computer program cause a machine to operate to perform the functions of the system described above.

Embodiments of the system may be used in a variety of applications. Although the system is not limited in this respect, the system may be implemented with memory devices in microcontrollers, general purpose microprocessors, digital signal processors (DSPs), reduced instruction-set computing (RISC), and complex instruction-set computing (CISC), among other electronic components.

Embodiments of the system may also be implemented using integrated circuit blocks referred to as main memory, cache memory, or other types of memory that store electronic instructions to be executed by a microprocessor or store data that may be used in arithmetic operations.

A number of embodiments of the invention have been described. Nevertheless, it will be understood that various modifications may be made without departing from the spirit and scope of the invention.

What is claimed is:

1. A display device for rendering a user interface comprising:
    a programmed computer processor for generating said user interface;
    said user interface comprising:
        an ask-side table that displays in a multi-column format, a plurality of ask-side entries for a specific security that is offered for sale by a market participant on a securities market, the ask-side entries including a lot size, a reserve size, and an ask price;
        an ask-side aggregate value for a specific ask-side entry, the ask-side aggregate value is equal to the lot size of the specific ask-side entry summed with the lot sizes of all preceding ask-side entries included in the ask-side table;
        a bid-side table that displays in a multi-column format, a plurality of bid-side entries for the specific security that is sought for purchase by a market participant on a securities market, the bid-side entries including a lot size, a reserve size, and a bid price with the bid-side display configured to display the bid-side entries multi-column format as essentially a mirror image of the ask-side entries multi-column format; and
        a bid-side aggregate value for a specific bid-side entry, the bid-side aggregate value is equal to the lot size of the specific bid-side entry summed with the lot sizes of all preceding bid-side entries included in the bid-side table.

2. The display device of claim 1 wherein the bid-side table is juxtaposed the ask-side table.

3. The display device of claim 2 wherein the ask-side display has multiple ask-side entries sorted in accordance with a user-defined sorting parameter.

4. The display device of claim 3 wherein the user-defined sorting parameter is chosen for the group consisting of: the lot size; the reserve size, and the ask price.

5. The display device of claim 1 wherein the bid-side table and the ask-side table are simultaneously displayed.

6. The display device of claim 5 wherein the bid-side has multiple bid-side entries sorted in accordance with a user-defined sorting parameter.

7. The display device of claim 6 wherein the user-defined sorting parameter is chosen for the group consisting of: the lot size; the reserve size, and the bid price.

8. The display device of claim 1 wherein the display allows a market participant to select the specific security.

9. The display device of claim 1 displays trade data concerning the specific security.

10. The display device of claim 9 wherein the trade data includes a trade volume amount, a low trade amount, and a high trade amount.

11. A method for displaying proprietary positions on an electronic trading system, the method executed on a computer system, the method comprising:
    displaying on a display device:
        an ask-side entry, in a multi-column format, for a specific security that is offered for sale by a market participant on a securities market, the ask-side entry includes a lot size, a reserve size, and an ask price; and
        an ask-side aggregate value for a specific ask-side entry, the ask-side aggregate value is equal to the lot size of the specific ask-side entry summed with the lot sizes of all preceding ask-side entries included in the ask-side table; displaying on the display device:
        a bid-side entry, in a multi-column format, for the specific security that is sought for purchase by a market participant on a securities market, the bid-side entry includes a lot size, a reserve size, and a bid price, with the bid-side entries being essentially a mirror image of the ask-side entries; and
        a bid-side aggregate value for a specific bid-side entry, the bid-side aggregate value is equal to the lot size of the specific bid-side entry summed with the lot sizes of all preceding bid-side entries included in the bid-side table.

12. The method of claim 11 wherein the bid side entry is juxtaposed the ask-side table.

13. The method of claim 12 wherein displaying ask-side entries includes sorting the multiple ask-side entries in accordance with a user-defined sorting parameter.

14. The method of claim 11 wherein the bid-side table and the ask-side table are simultaneously displayed.

15. The method of claim 14 wherein displaying bid-side entries includes sorting the multiple bid-side entries in accordance with a user-defined sorting parameter.

16. The method of claim 11 further comprising allowing a market participant to select the specific security.

17. The method of claim 11 further comprising displaying trade data concerning the specific security.

18. A computer program product residing on a computer readable medium for rendering a display of proprietary positions in an electronic trading system, the computer readable medium having a plurality of instructions stored thereon which, when executed by a processor, cause that processor to:
- display an ask-side table that displays a plurality of ask-side entries in a multi-column format, for a specific security that is offered for sale by a market participant on a securities market, the ask-side entries including a lot size, a reserve size, and an ask price; and
- display a bid-side entry, in a multi-column format, for the specific security that is sought for purchase by a market participant on a securities market, the bid-side entries including a lot size, a reserve size, and a bid price, with the bid-side entries being essentially a mirror image of the ask-side entries;
- display an aggregate value for a specific bid-side or ask side entry, wherein the bid-side or ask side aggregate value is equal to the lot size of that specific bid-side or ask side entry summed with the lot sizes of all preceding bid-side or ask side entries included in a bid-side or ask side table.

19. The computer program product of claim 18 wherein instructions to display ask-side entries further includes instructions to sort the multiple ask-side entries in accordance with a user-defined sorting parameter.

20. The computer program product of claim 18 wherein instructions to display a bid-side entries further includes instructions to sort the multiple bid-side entries in accordance with a user-defined sorting parameter.

* * * * *